(12) United States Patent
Negrello et al.

(10) Patent No.: US 11,499,580 B2
(45) Date of Patent: Nov. 15, 2022

(54) FRAMEWORK STRUCTURE OF A PIECE OF HOME AUTOMATION EQUIPMENT AND METHOD FOR INSTALLING A FRAMEWORK STRUCTURE OF A PIECE OF HOME AUTOMATION EQUIPMENT

(71) Applicant: SOMFY ACTIVITES SA, Cluses (FR)

(72) Inventors: Frederic Negrello, Cluses (FR); Norbert Dupielet, Sallanches (FR); Jean-Michel Perache, Taninges (FR); Bruno Cachaud, Champagne Mouton (FR); Pierre Guedon, Dardilly (FR); Guillaume Ducretet-Pajot, Villeurbanne (FR)

(73) Assignee: SOMFY ACTIVITES SA, Cluses (FR)

( * ) Notice: Subject to any disclaimer, the term of this patent is extended or adjusted under 35 U.S.C. 154(b) by 84 days.

(21) Appl. No.: 16/466,137

(22) PCT Filed: Dec. 5, 2017

(86) PCT No.: PCT/EP2017/081574
§ 371 (c)(1),
(2) Date: Jun. 3, 2019

(87) PCT Pub. No.: WO2018/104335
PCT Pub. Date: Jun. 14, 2018

(65) Prior Publication Data
US 2020/0063773 A1 Feb. 27, 2020

(30) Foreign Application Priority Data
Dec. 5, 2016 (FR) ...................................... 1661905

(51) Int. Cl.
*F16B 13/00* (2006.01)
*F16M 13/00* (2006.01)
(Continued)

(52) U.S. Cl.
CPC ............ *F16B 5/0225* (2013.01); *B60Q 1/045* (2013.01); *F16B 5/0233* (2013.01);
(Continued)

(58) Field of Classification Search
CPC .......... H01Q 1/106; H01Q 1/22; H01Q 1/325; F16B 5/0283; F16B 5/0233; F16B 5/0628;
(Continued)

(56) References Cited

U.S. PATENT DOCUMENTS

| 874,311 A | 12/1907 | Doran | |
|---|---|---|---|
| 4,079,604 A * | 3/1978 | Anderegg | B60R 11/0205 248/285.1 |
| RE35,677 E * | 12/1997 | O'Neill | E05B 73/0082 248/316.4 |
| 6,092,953 A * | 7/2000 | Chaptal | B62D 29/048 296/187.01 |

(Continued)

FOREIGN PATENT DOCUMENTS

| CN | 105113683 | 12/2015 |
|---|---|---|
| DE | 202014007350 | 10/2014 |
| EP | 0860615 | 8/1998 |

OTHER PUBLICATIONS

Office Action in CN 201780074825X dated Apr. 2, 2020.
International Search Report mailed in PCT/EP2017/081574 dated Feb. 19, 2018.

*Primary Examiner* — Tan Le
(74) *Attorney, Agent, or Firm* — Wissing Miller LLP

(57) ABSTRACT

The invention relates to a method for installing a piece of home automation equipment, and to a system for adjustably attaching a piece of home automation equipment to a wall, comprising at least two supports (1), each one comprising a support shaft and a holding device, and at least two adjustable attaching elements. The adjustable attaching elements each comprise a supporting frame (2) and a mechanical connection element (3). The adjustable attaching elements also comprise a locking device.

14 Claims, 9 Drawing Sheets

(51) Int. Cl.
*F16B 5/02* (2006.01)
*E06B 9/30* (2006.01)
*F16B 5/06* (2006.01)
*B60Q 1/04* (2006.01)
*H01Q 1/10* (2006.01)
*H01Q 1/22* (2006.01)
*H01Q 1/32* (2006.01)

(52) U.S. Cl.
CPC .......... *F16B 5/0283* (2013.01); *F16B 5/0628* (2013.01); *H01Q 1/106* (2013.01); *H01Q 1/22* (2013.01); *H01Q 1/325* (2013.01)

(58) Field of Classification Search
CPC ........ F16B 5/0225; F16B 13/00; B60Q 1/045; F16M 13/00
See application file for complete search history.

(56) References Cited

U.S. PATENT DOCUMENTS

| | | | |
|---|---|---|---|
| 6,719,260 B1* | 4/2004 | Hart | A47G 1/168 248/466 |
| 7,611,109 B2* | 11/2009 | Lin | F16M 13/02 248/222.52 |
| 8,979,049 B2* | 3/2015 | Yoshida | F16M 13/02 248/224.51 |
| 9,182,078 B1* | 11/2015 | Cheng | A47G 1/24 |
| 2004/0056167 A1 | 3/2004 | Vogt | |
| 2007/0187566 A1 | 8/2007 | Price | |
| 2010/0104124 A1* | 4/2010 | Abraham | H04R 1/028 381/333 |
| 2013/0284383 A1 | 10/2013 | Feldstein | |

* cited by examiner

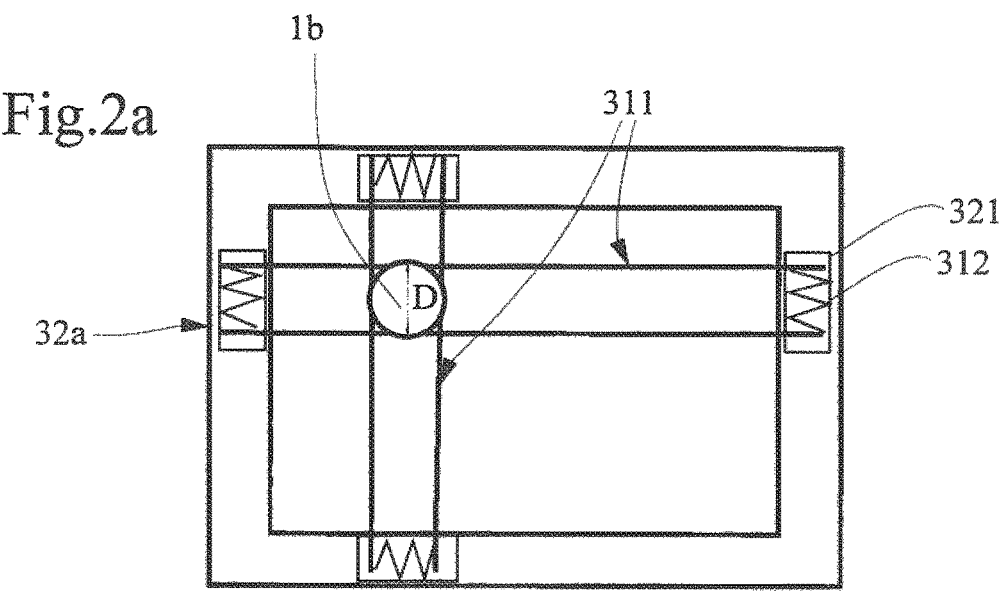
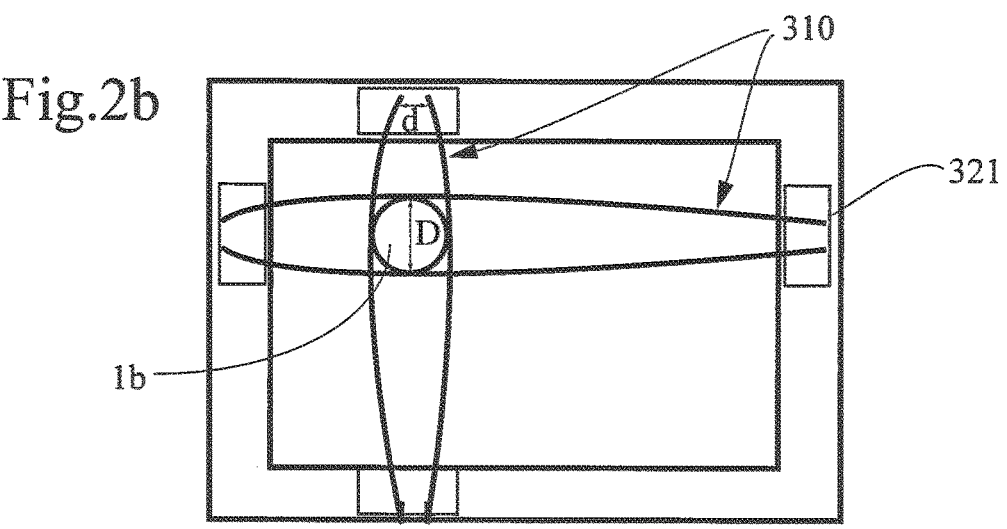
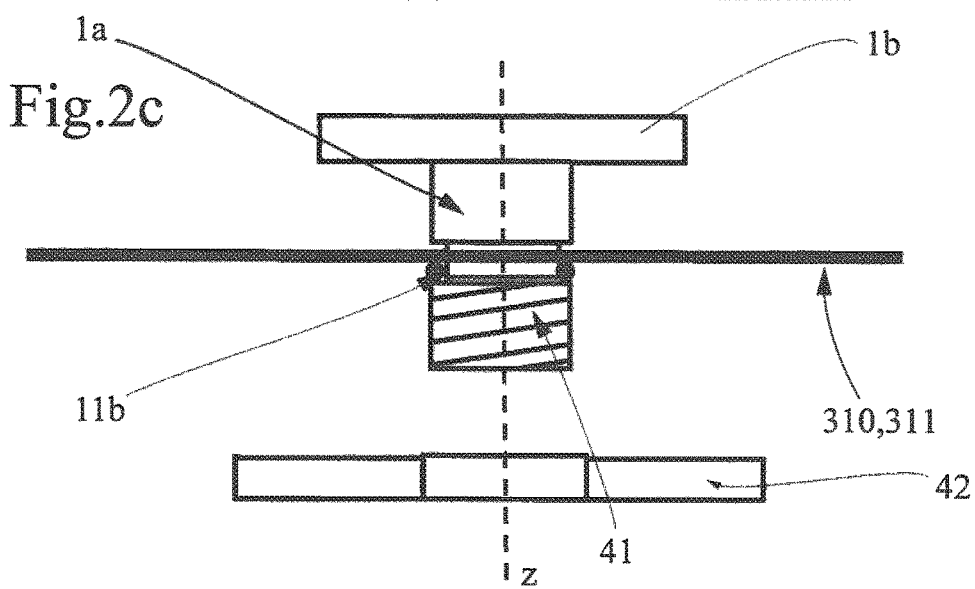

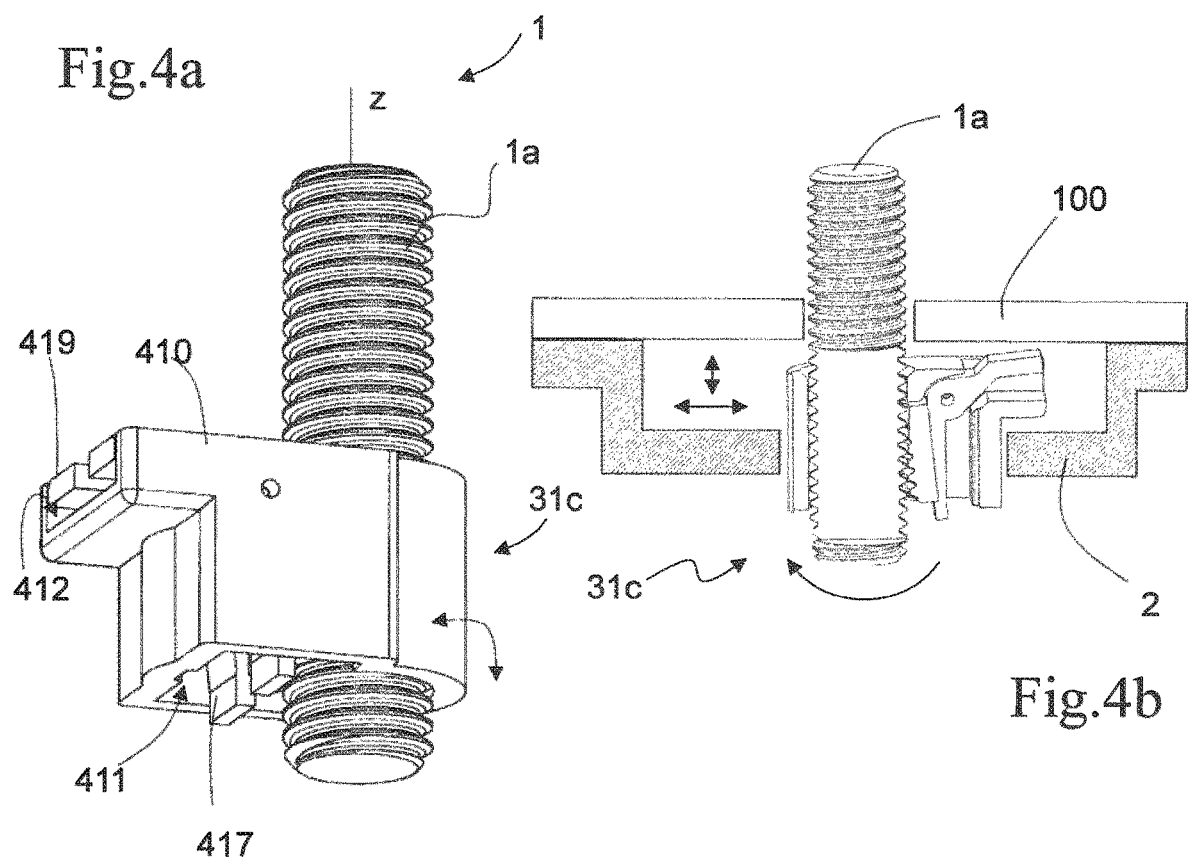
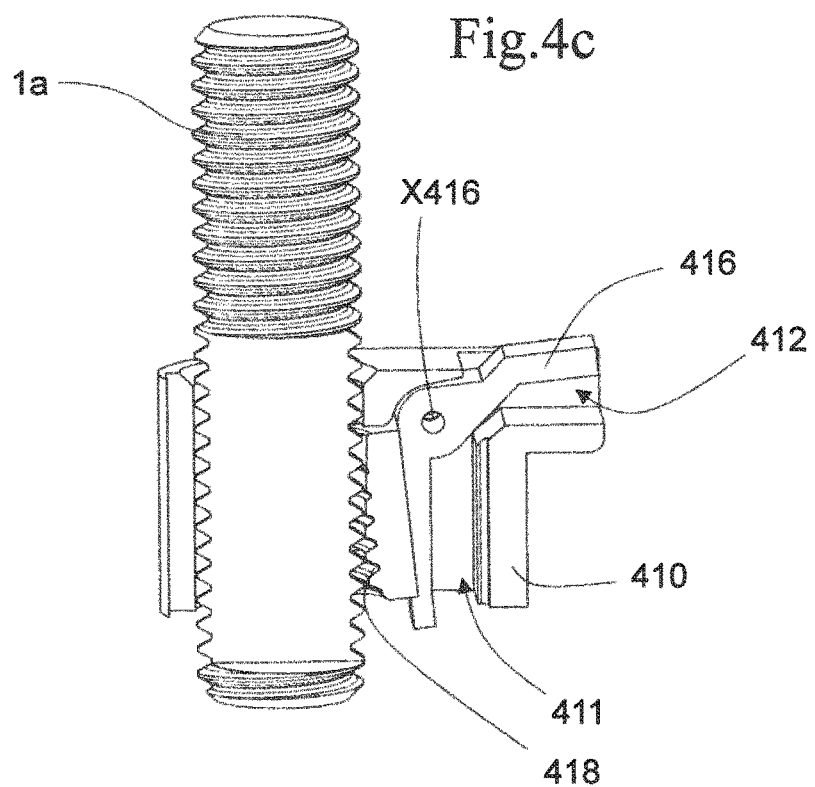

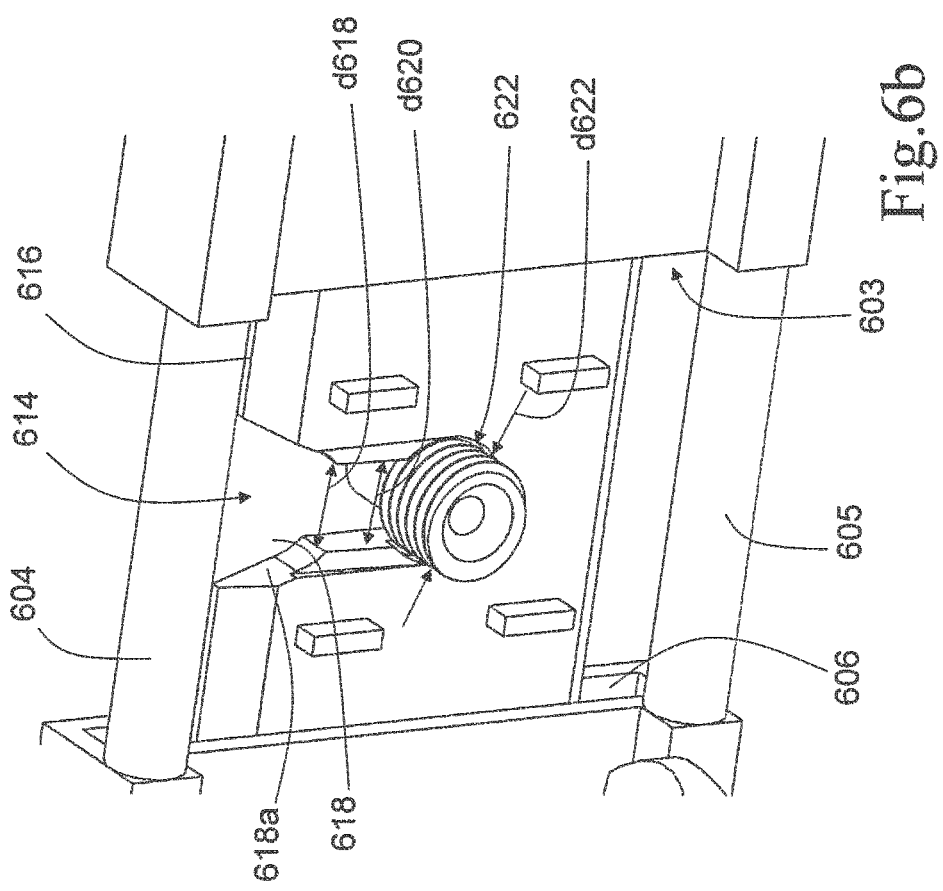
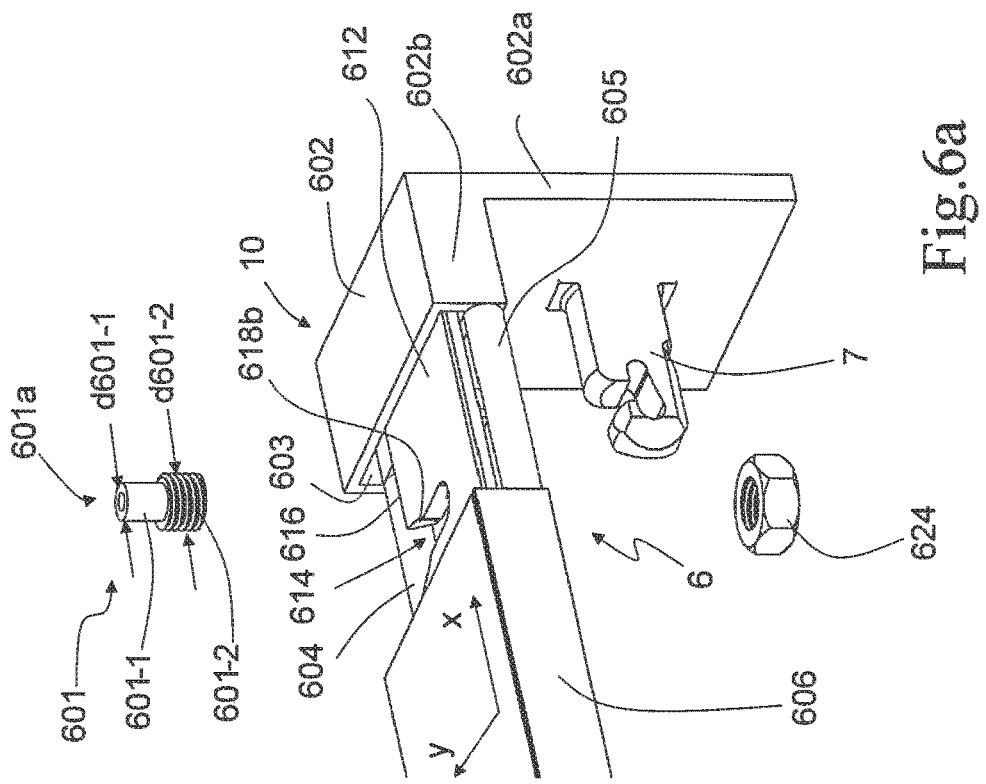

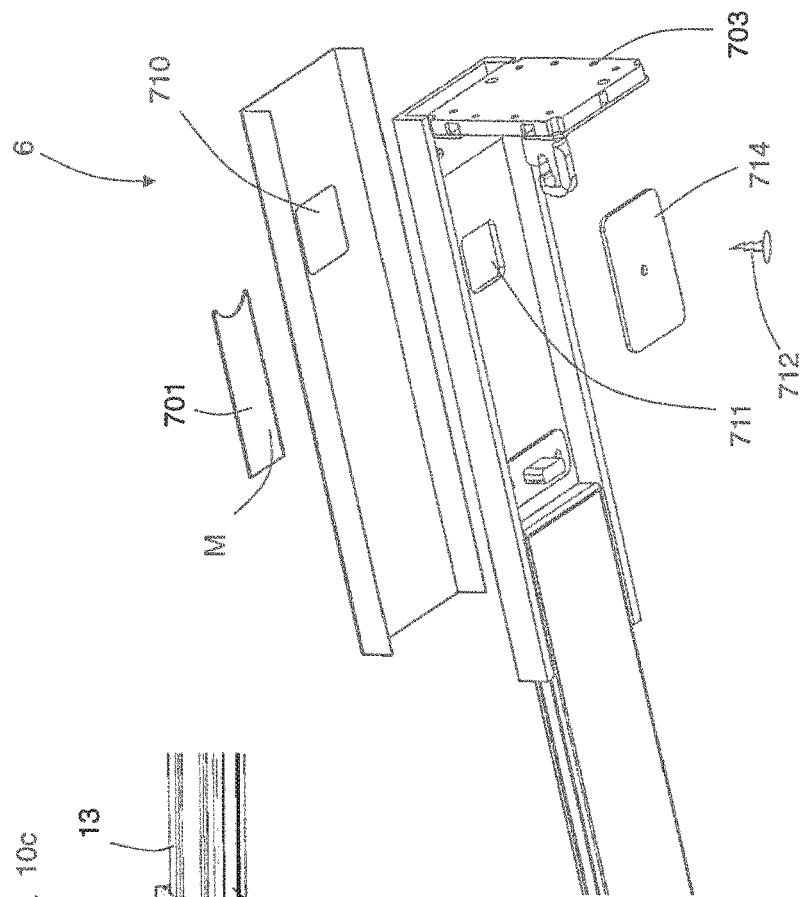
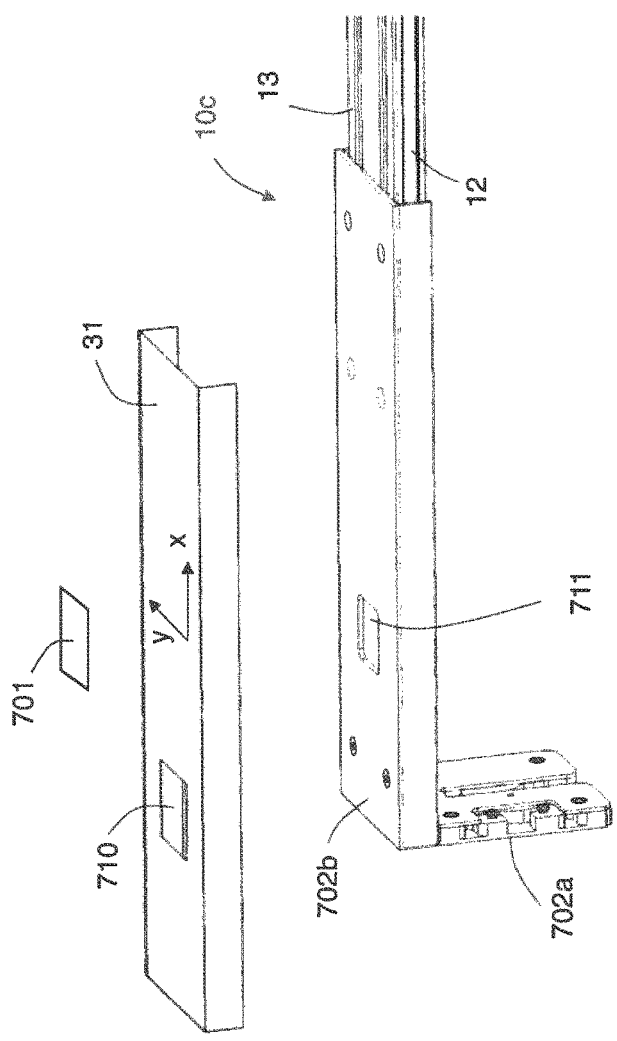
Fig. 7b
Fig. 7a

FRAMEWORK STRUCTURE OF A PIECE OF HOME AUTOMATION EQUIPMENT AND METHOD FOR INSTALLING A FRAMEWORK STRUCTURE OF A PIECE OF HOME AUTOMATION EQUIPMENT

This application is a 371 of PCT/EP2017/081574 filed on Dec. 5, 2017, published on Jun. 14, 2018 under publication number WO 2018/104335, which claims priority benefits from French Patent Application No. 1661905 filed on Dec. 5, 2016, the disclosure of which is incorporated herein by reference.

TECHNICAL FIELD

The present invention relates to a system for fastening a piece of home automation equipment. The fastening system in particular comprises a fastener adjustable so as to adjust the positioning of the piece of equipment relative to its attachment points. The invention also relates to a piece of home automation equipment comprising such a system as well as a method for adjusting the position of such a piece of equipment.

BACKGROUND OF THE INVENTION

During the installation of pieces of home animation equipment, the alignment of the different parts of the pieces of equipment is essential for their proper operation. "Pieces of home automation equipment" refers, inter alia, to protection devices for the exits of a building. These devices can take the form of blinds, curtains or shutters, and can be winding or folding, so as to assume withdrawn or retracted, deployed or intermediate positions. Such pieces of automation equipment often comprise moving elements and guide elements. It is therefore important for the moving elements to be properly aligned relative to the guide elements, so as to avoid malfunctions or premature wear of the parts. This alignment relates at least to two orthogonal directions.

The pieces of home automation equipment can be bulky, which sometimes makes their installation difficult. In the case at hand, the alignment of the moving parts relative to the guide elements or relative to the dimensions of the opening to be protected can be awkward. During installation, it is therefore necessary to provide adjustment means to make it possible to compensate any imprecisions in the various installation operations, for example the piercing of the wall on which the piece of home automation equipment is installed. U.S. Pat. No. 874,311 describes a sun protection system, comprising frames mounted on a wall, in which supports can slide forming a chassis of the framework structure of the sun protection, making it possible to adjust the blind laterally relative to the window. The frames and the supports are provided with piercings, which make it possible to fasten the blind discreetly, in different positions relative to the frames.

The adjustment of the framework structure is only possible in a single direction, the chassis of the framework structure itself only being translatable relative to the frames.

There is therefore room to develop pieces of home automation equipment that are easier to install, allowing a single person to hold a chassis of the framework structure of a blind and to adjust it in at least two directions before locking these adjustments.

BRIEF DESCRIPTION OF THE INVENTION

The present invention makes it possible to offset the aforementioned drawbacks owing to the use of a framework structure comprising a chassis, at least one support provided with a holding device and at least two adjustable fasteners, which comprise elements translatable along at least two directions that are orthogonal relative to the framework structure. Furthermore, the framework structure also comprises a mechanical connection device comprising an attaching device cooperating with a holding device of the support, to support the chassis of the framework structure of the piece of home automation equipment on the wall before its adjustment. The use of the attaching device facilitates the suspension of the piece of home automation equipment on the wall, which can optionally be done by a single person.

Once suspended, the piece of home automation equipment can be repositioned relative to the environment owing to the adjustable fasteners. Advantageously, the adjustable fasteners are centered automatically on the supports of a wall. Next, the chassis of the framework structure of the piece of home automation equipment can be offset along several directional axes before being definitively set.

The framework structure is more particularly characterized by the following elements, considered separately or in combination:

The framework structure comprises an adjustable fastening system, which includes at least a support and a holding device and the support is capable of being secured to the wall.

The framework structure comprises a chassis and at least two adjustable fasteners each comprising a mechanical connection device. The mechanical connection devices include an adjusting device and a locking device.

The framework structure comprises an attaching device cooperating with the holding device of the support. The adjusting device allows an adjustment of the chassis of the framework structure along at least two directions that are orthogonal relative to the support.

The support(s) include a support axis and a holding device.

The adjustable fasteners each comprise:
a support frame,
an adjusting device connected to the support frame and including elements translatable along at least two directions that are orthogonal relative to the chassis of the framework structure, and
a locking device.

The framework structure can further comprise:
at least two supports each including a support axis and a holding device, the supports being capable of being secured to the wall,
and at least two adjustable fasteners each including:
a support frame,
a mechanical connection device,
a locking device,
and such that the mechanical connection device includes an attaching device cooperating with the holding device of the support, and an adjusting device connected to the support frame and including elements translatable relative to the support frame.

The support frame of the framework structure is translatable relative to the chassis of the framework structure and the locking device is capable of blocking the movement of the support frame relative to the chassis of the framework structure.

The holding device of the support comprises an at least partially threaded element fastened to the wall. The locking device comprises a tapped element making it possible to grip the support frame on the chassis of the framework structure. In this case, the threaded element is preferably a nut, screwed on the holding device of the support along the direction of the support axis so as to grip the support frame in the direction of the chassis of the framework element and in the direction of the wall.

The chassis preferably comprises at least two rails facing one another and at a distance from one another, the support frame being mounted sliding in the two rails along two orthogonal directions.

The support frame can comprise an opening extending from one edge of the support frame making it possible to accommodate a first part of the support axis.

The attaching device of the framework structure can be in the form of a recess in the thickness of the first support frame, making it possible to accommodate a second part of the support axis at least partially.

The framework structure can comprise at least two supports capable of being secured to the wall and two adjustable fasteners each cooperating with a support.

The present invention also comprises an installation method on a wall of the framework structure of a piece of home automation equipment. The method in particular comprises the following steps:
 a) fastening at least one support to the wall,
 b) connecting the attaching device of the framework structure on the holding device of the corresponding support, the chassis of the framework structure thus being self-supported by the support,
 c) adjusting the position of a first adjustable fastener along two directions relative to a first support, and
 d) locking the position of the first adjustable fastener relative to the chassis of the framework structure.

The installation method can further comprise the following steps:
 e) adjusting the position of a second adjustable fastener along two directions, and
 f) locking the position of the first adjustable fastener relative to the chassis of the framework structure.

In particular, the locking step can be a step for gripping the adjustable fastener against the chassis of the framework structure and the chassis of the framework structure against the wall (P).

BRIEF DESCRIPTION OF THE DRAWINGS

FIG. 1a shows the approach of the chassis of the framework structure toward the wall, on which the supports are positioned, so as to connect the chassis of the framework structure to the corresponding supports, FIG. 1b illustrates the locking operation, and FIG. 1c illustrates the fastening of other elements of the piece of home automation equipment on the framework structure.

FIGS. 2a, 2b, 2c: example of adjustable fastener according to one embodiment, where FIGS. 2a and 2b illustrate two versions of an attaching means by links, and FIG. 2c shows an example locking system by gripping.

FIG. 3a shows an exploded view of the fastening system, comprising a support and an adjustable fastener, where FIG. 3b shows another exploded view of the same fastening system, and where FIG. 3c shows a longitudinal sectional view of the adjustable fastener, assembled with the chassis of the framework structure and connected to the support.

FIGS. 4a, 4b, 4c: example of adjustable fastener according to a third embodiment, where FIGS. 4a and 4b illustrate an attaching means by notches, and FIG. 4c shows an example locking system by gripping.

FIGS. 5a and 5b illustrate an attaching means by screw and nut.

FIGS. 6a, 6b: example of adjustable fastener according to a fifth embodiment, where FIGS. 6a and 6b illustrate an attaching means by interlocking.

FIGS. 7a, 7b: example of adjustable fastener according to a sixth embodiment, where FIGS. 7a and 7b illustrate a magnetic attaching means.

DETAILED DESCRIPTION OF THE INVENTION

Figure 1A:
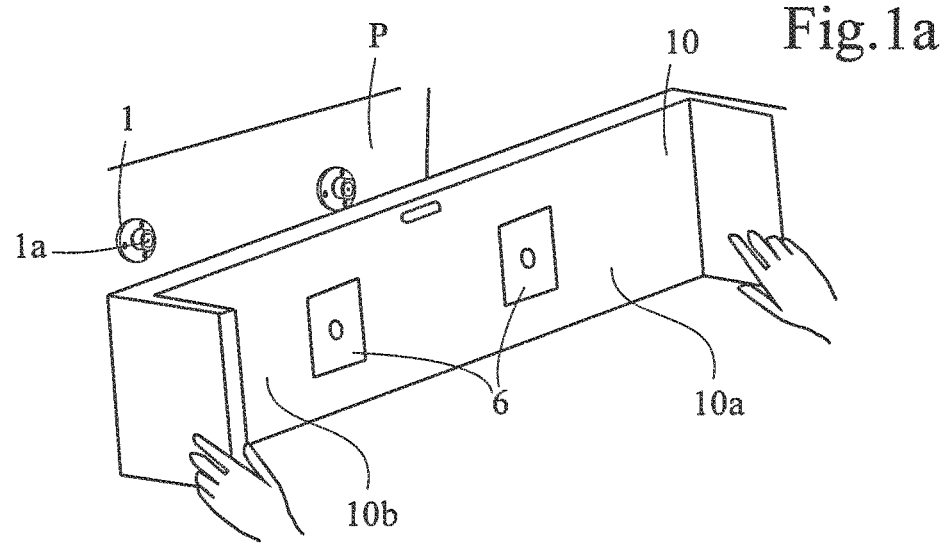
FIGS. 1a, 1b, 1c: explanatory diagram of the installation of the framework structure on a wall where
Figure 1B:
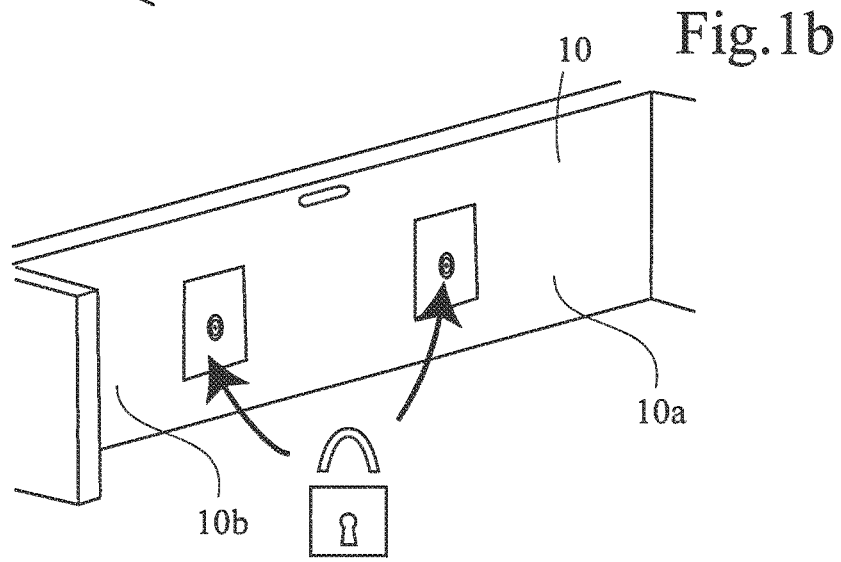
Figure 1C:
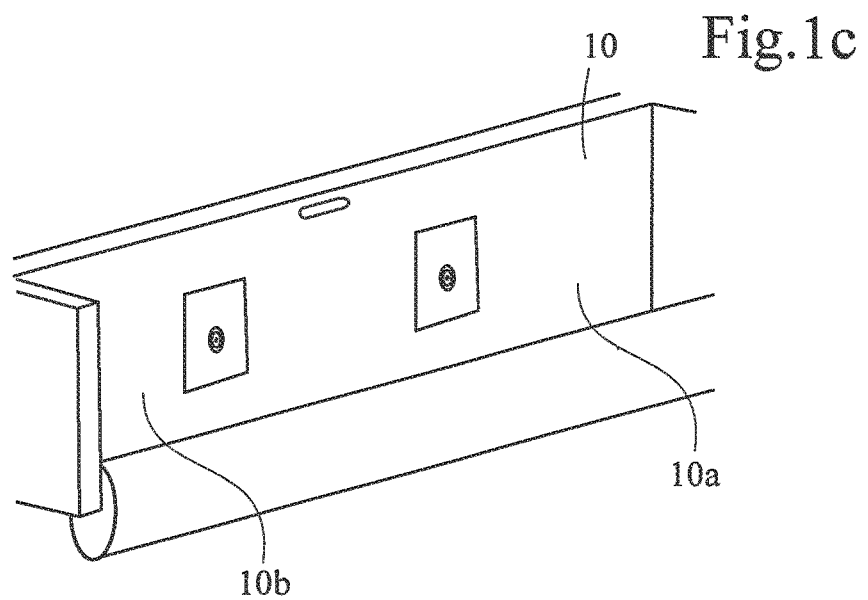

A first aspect of the invention relates to a framework structure comprising a chassis 10c and an adjustable fastening system S. Such an adjustable fastening system allows the suspension of a piece of home automation equipment on a wall P, in particular the fastening of the chassis 10c of the framework structure 10, as well as the adjustment of its position. The chassis 10c of the framework structure 10 of the piece of home automation equipment can be made by a set of two elongated angle bars 100, assembled to one another (not shown). An angle bar is a metal or plastic profile whose section forms an L, thus having two wings at a right angle. Preferably, the two angle bars, in particular the wings of the angle bars facing one another, are not joined, their assembly thus forming a rail at least partially open on two of its opposite faces. Alternatively, the chassis 10c of the framework structure 10 can be made from an elongated piece having a C-shaped section. The rail thus formed is only open on one of its faces, but openings can be provided on the opposite face for the fastening of the framework structure 10 to the wall P. Alternatively, the chassis 10c of the framework structure 10 can be made from two angle bars each having a C-shaped section, the openings of the two angle bars facing one another. The adjustable fastening system S comprises at least one support 1, preferably at least two supports 1, fastened irremovably to the wall P, as indicated for example in FIG. 1a, and at least two adjustable fasteners 6. The adjustable fasteners 6 are arranged on the piece of home automation equipment, or integrated into the piece of home automation equipment. The adjustable fasteners 6 are in particular connected to the chassis 10c of the framework structure 10 of a piece of home automation equipment, in other words integrated into the rail formed by the chassis 10c of the framework structure 10. The wall P can be a vertical wall or the ceiling of a room, or the upper rim of the border of a building opening, such as a door, a window or a picture window.

A support 1 preferably contains a support axis 1a arranged perpendicular to the wall P and a support platen 1b extending in a plane substantially perpendicular to the support axis 1a. A support 1 can be fastened to the wall P for example via the support platen 1b, which can be equipped with one or several holes allowing the passage of screws. Other typical fastening means can be used, for example the support can be hollow, and fastened by means of a screw to the wall, the screw penetrating the hollow of the support. The free end of the support axis 1b is intended to cooperate with the adjustable fastener 6 of the framework structure 10 of a home automation device or with an attaching device 31 of the framework structure. The free end of the support axis 1b is preferably beveled, so as to facilitate the placement of the adjustable fastener 6 or of the attaching device 31 on the support 1, in particular in the case of any misalignments between the adjustable fastener 6 or the attaching device 31 and the support 1.

The axis of the support 1b is provided with a holding device M, making it possible to retain the adjustable fastener 6, once connected to the support 1. In the first embodiment, the holding device M comprises a lip 11a traveling the circumference of the support axis 1a, close to the free end of the support axis 1a. The lip 11a can be continuous or discontinuous. In the first and second embodiments, the holding device M comprises a slot 11b, arranged on the circumference of the support axis 1a, intended to retain the adjustable fastener 6.

The adjustable fasteners 6 each comprise a support frame 2. The support frame 2 can be movable relative to the chassis 10c of the framework structure 10 or secured to the chassis 10c of the framework structure 10 of the piece of home automation equipment, and delimits a zone arranged in the framework structure 10. The support frame 2 can be secured to the chassis 10c of the framework structure 10 by any appropriate fastening means. It may for example be clipped in a thickness of the framework structure 10, or screwed on a surface of the chassis 10c of the framework structure 10, or glued or welded. The support frame 2 preferably delimits a square or rectangular zone in the chassis 10c of the framework structure 10, along the main longitudinal x and transverse y axes of the framework structure 10. The support frame 2 is partially blocked along at least one degree of freedom, by the chassis 10c of the framework structure itself, in particular by the L- or C-shaped wings opposite the angle bars 100 forming the chassis 10c of the framework structure 10 or by any other part provided to that end. The framework structure comprises a mechanical connecting device 3, making it possible to connect the chassis 10c of the framework structure 10 removably on a support 1 of the wall P before adjusting the position thereof relative to this support 1. The mechanical connecting device 3 includes the attaching device 31, which cooperates with the corresponding support axis 1a to establish the mechanical connection between the support 1 and the chassis 10c of the framework structure 10.

The adjustable fasteners also comprise an adjusting device 32. The adjusting device 32 includes translatable elements making it possible to adjust the relative position of the chassis 10c of the framework structure 10 relative to the support 1. The mobile elements preferably make it possible to move the chassis 10c of the framework structure 10 along two axes parallel to the wall P, orthogonal to one another and perpendicular to the axis of the support 1a. It is, however, possible to consider that the mobile elements of the adjusting device 32 make it possible to adjust the position of the chassis 10c of the framework structure 10 relative to the support 1 also along a third direction.

The adjusting devices 32 form an assembly connected with the support frame 2.

The adjustable fasteners 6 each comprise a locking device 4, making it possible to maintain the position of the chassis 10c of the framework structure 10 relative to the supports 1 once adjusted. In particular, the locking device 4 makes it possible to block the translation of the moving parts of the adjusting device 32 or the support frame itself in the case where it is mobile. The translation of the moving parts of the adjusting device 32 can be provided by blocking the movement of these moving parts relative to one another, in particular once the attaching device 31 is connected to the axis of the support 1a. In the first embodiment, the locking device 4 cooperates with the support 1 and the attaching device 31. In the second embodiment, the locking device 4 can block the moving parts of the adjusting device 32 by preventing the translational movement relative to the support frame 2. In this case, the locking device 4 cooperates with the adjusting device 32 and the support frame 2, independent of the support 1, which makes it possible to preserve the adjustment even in case of disassembly of the chassis 10c of the framework structure relative to the supports 1. In this case, the adjustable fastening system according to the present invention makes it possible to disconnect the chassis 10c from the framework structure 10 of the supports without unlocking the locking device 4. The adjustment of the alignments can thus be preserved for a quick reinstatement of the chassis 10c of the framework structure 10. The locking device 4 can also block the mobility of the support frame 2 relative to the chassis 10c of the framework structure 10 or an angle bar 100 of the framework structure 10, in the case where it is provided that the support frame 2 can be mobile relative to the chassis 10c of the framework structure 10.

FIGS. 2a, 2b, 2c show a first embodiment of an adjustable fastening system S. The support 1 comprises a support axis 1a oriented perpendicular to the wall P, along the direction z, and a support platen 1b. The support axis 1a is provided with a circular slot 11b on its circumference, making it possible to accommodate the attaching device 31 of the adjustable fastener 6. The attaching device 31 is in particular an attaching device 31a including two pairs of parallel and flexible links 310, as illustrated in FIG. 2b. The links of each pair are separated by a distance d smaller than the diameter D of the axis of the support 1b. The links 310 are oriented perpendicular to the axis z. The pairs of links 310 can be orthogonal to one another, and oriented along the directions x and y. The attaching device 31a allows the mechanical connection with the axis of the support 1b owing to the resilient deformation of the links 310 around the axis of the support 1b and their positioning in the slot 11b of the axis of the support 1b by spring effect. The axis of the support 1b can advantageously be beveled at its end so as to favor its insertion between the pairs of links 310.

Alternatively, the pairs of flexible links 310 can be replaced by pairs of rigid links 311, as illustrated in FIG. 2a. The rigid links 311 are kept at a distance d smaller than the diameter D of the axis of the support 1b by two return springs 312. The return spring 312 can be arranged at the ends of the links 311. They stretch upon passage of the links 311 around the axis of the support 1b and automatically reposition the links 311 in the slot 11b of the axis of the support 1a owing to their return force.

The adjusting device 32 according to this arrangement is in particular an adjusting device 32a that comprises bases 321 connected to the support frame 2 and translatable relative to the support frame 2. There are in particular four bases, each of which is arranged on one side of the support frame 2. The parallel links 310, 311 are fastened in pairs at each of their ends on a base 321. In the case where the links are flexible, they can be fastened to the bases 321 non-movably. In other words, the flexible links are secured to the bases 321 by any rigid fastening means. They can for example be gripped by a metallic platen (not shown) screwed on the base 321, molded directly in the base 321, or inserted in holes of the base 321 provided to that end. Other fastening means can also be used.

When the links 311 are maintained by return springs 312, their ends are movable relative to the bases 321. In other words, the return springs 312 are secured to the bases 321, while guaranteeing the connection between the links 311 and the bases 321.

Each pair of links 310, 311 can be moved relative to the support frame 2 either in the longitudinal direction x or in the transverse direction y, owing to the mobility of the bases 321 on the support frame 2. To that end, each base 321 can be inserted into a slot arranged in the support frame 2 so as to slide freely in one or the other of the longitudinal x or transverse y directions. Other types of mechanical connections can also be used by one skilled in the art to maintain the bases 321 in relation to the support frame 2.

Each side of the support frame 2 includes a base 321, and the opposite bases maintain a pair of links 310, 311. The adjustment of the chassis 10c of the framework structure 10 of the piece of home automation equipment is done owing to the translation of one or two pairs of bases 321, thus making it possible to reposition the axis of the support 1b along the links 310, 311.

The locking of the position of the frame 10c of the framework structure 10, once adjusted, can be done by pinching of the links 310, 311 on the support 1. To that end, the locking device 4 comprises a threaded element, cooperating with the end of the axis of the support 1a so as to simultaneously grip the pairs of links 310, 311 on the axis of the support 1a.

Preferably, the end of the support axis 1b is in turn threaded to allow the gripping of a wide and flat washer 42, the flat head of the washer compressing the links 310, 311 on one edge of the slot 11b in which they are maintained and thus inhibiting their movements relative to the axis of the support 1a. According to one possible embodiment, a sliding part (not shown) can be provided on the links 310, 311, with the possibility of sliding on each pair of links 310, 311. This sliding part comprises a central opening, with a diameter slightly larger than the diameter D of the support axis 1a. The locking of the position of the chassis 10c of the framework structure 10, once adjusted, can be done by pinching of this sliding part on the support 1a, this pinching having the additional effect of pinching the links relative to one another, thus preventing the movement of the support frame 2 on the support 1.

Figure 3A:
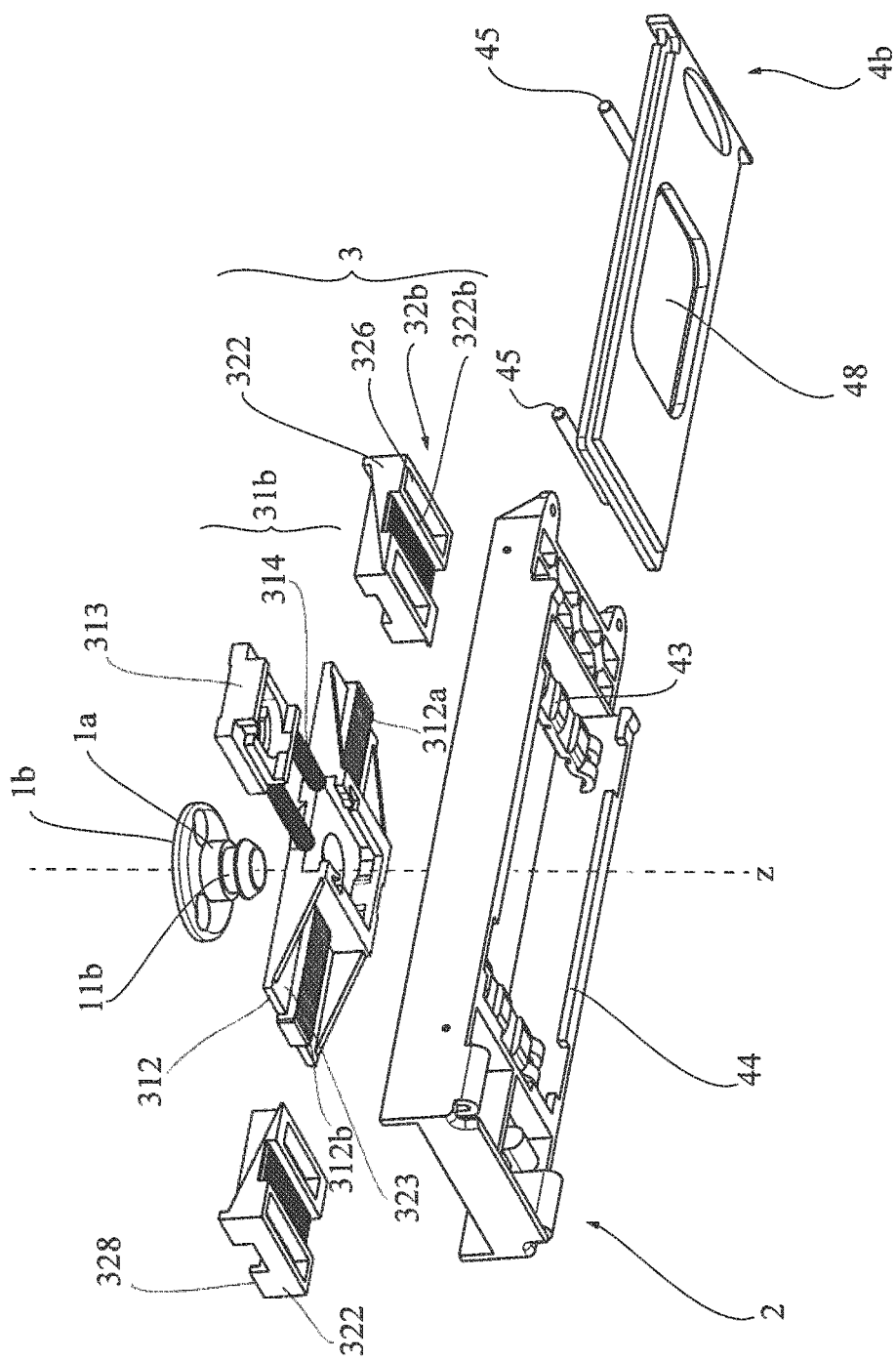
FIGS. 3a, 3b, 3c: example of adjustable fastener according to a second embodiment, where
Figure 3B:
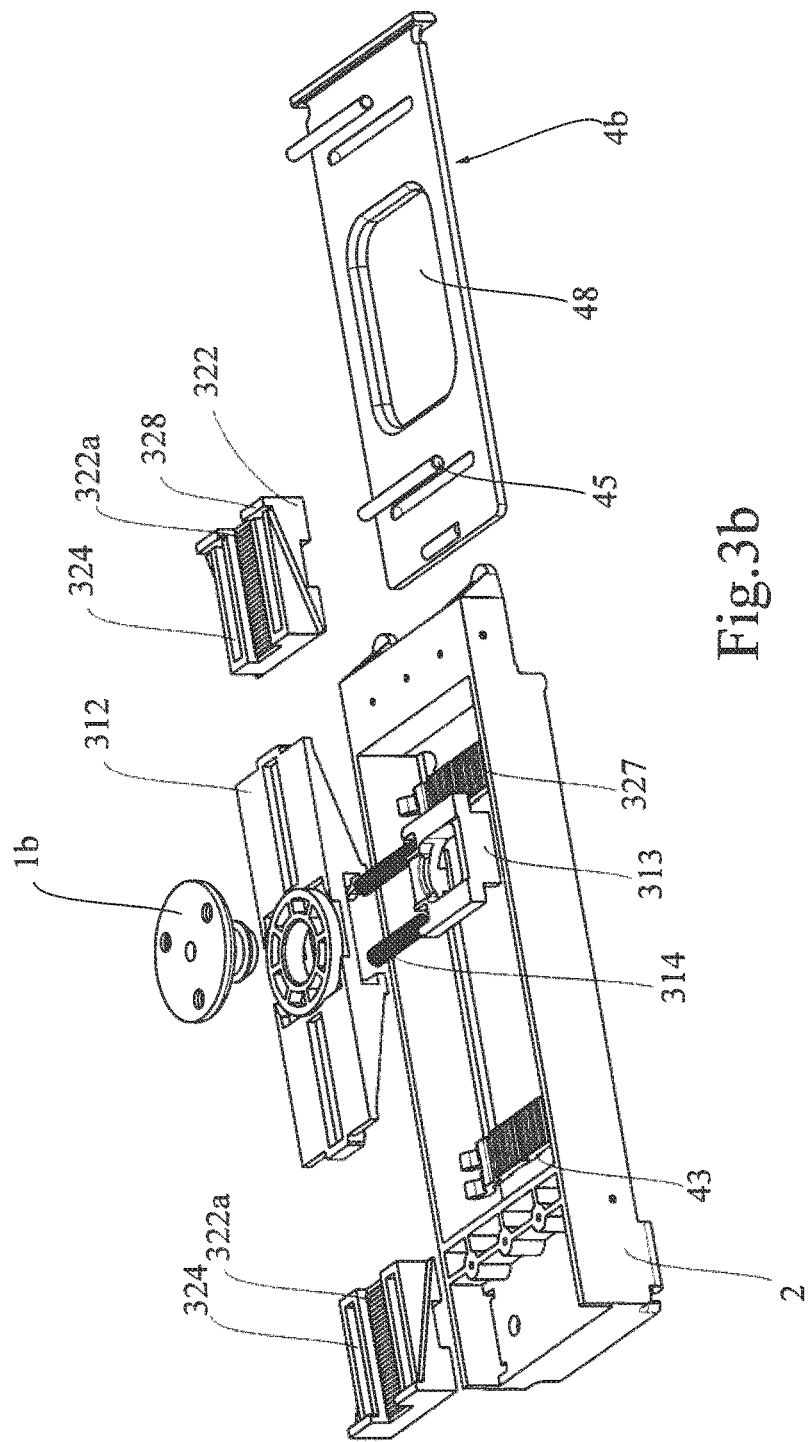

FIGS. 3a and 3b show a second embodiment of an adjustable fastening system. The support 1 is made up of a support axis 1a oriented perpendicular to the wall P, along the direction z, and a support platen 1b. The support axis 1a is provided with a circular slot 11b on its circumference, making it possible to accommodate the attaching device 31 for the adjustable fastening 6. The attaching device 31 is in particular an attaching device 31b, comprising a platen 312 pierced with a hole with a sufficient diameter to be inserted on the axis of the support 1a, and a clipping part 313, also pierced with a hole with a sufficient diameter to be inserted on the axis of the support 1a. The diameter of the holes arranged in the platen 312 and the clipping part 313 can be equal or different. It is preferably equal for the platen 312 and the clipping part 313 and greater than the diameter D of the support axis 1a by a value of between 0.1 cm and 1 cm. The platen 312 and the clipping part 313 are combined such that their respective holes coincide and allow the insertion of two parts 312, 313 on the axis of the support 1a.

The clipping part 313 can be secured to the plate 312 along an axis z owing to a housing arranged in the thickness of the platen 312 where the clipping part 313 can be inserted. In other words, the clipping part retains partial mobility relative to the platen along one of the longitudinal x or transverse y axes, and loses any mobility relative to the platen 312 along the axis z.

One or several springs 314 are arranged between the clipping part 313 and the platen 312 so as to keep, when one or several of the springs are idle, an offset between the holes of the clipping part 313 and the platen 312 along one of the longitudinal x or transverse y axes. The hole of the clipping part 313 is aligned with that of the platen 312 against the force of the spring, at the time of the insertion of the axis of the support 1a through the two parts 312, 313 previously assembled. The springs 314 make it possible to offset the clipping part 313 automatically in the slot 11b of the axis of the support 1a, once the attaching parts are inserted on the support axis 1a. Alternatively, the circular slot 11b arranged in the axis of the support 1a can be replaced by a bevel facilitating the insertion of the clipping part 313 on the support 1.

The adjusting device 32 according to this arrangement is in particular an adjusting device 32b comprising two intermediate parts 322 cooperating on the one hand with the support frame 2 and on the other hand with the plate 312. To that end, the plate 312 is provided with two notched zones 312a, 312b, extending along an axis parallel to the longitudinal axis x of the support frame 2 and arranged on the visible face of the platen 312. The visible face extends as the face visible by the installer when the platen 312 is connected to the axis of the support 1a. The notched zones 312a, 312b each form an overthickness delimited laterally by two flat surfaces 323 and each cooperate with a first notched zone 322a arranged on the rear face of the intermediate parts 322. The rear face of the intermediate parts 322 extends as the face not visible by the installer, placed opposite the visible face of the platen 312, where the notched zones 312a, 312b are arranged. The first notched zone 322a of the rear face of an intermediate part 322 is laterally bordered by two flat surfaces 324 in overthickness intended to come in contact with the flat surfaces 323 that delimit the corresponding notched zone 312a, 312b of the platen 312. The first notched zone 322a of the intermediate parts 322 and the corresponding notched zone 312a, 312b of the platen, when they are in tightened contact with one another, make it possible to prevent the respective sliding of the intermediate parts 322 relative to the platen 312. The flat surfaces 323, 324 delimiting the notched zones of the platen 312 and the first notched zone 322a of the intermediate parts 322 in turn eliminate any lateral movement of the intermediate parts 322 relative to the platen 312, and behave like guideways. When the contact is looser, the intermediate parts 322 can remain movable in translation relative to the platen 312 along the longitudinal axis x of the support frame 2, while being blocked laterally by the cooperation of the flat surfaces 322, 324. In other words, the translation can be allowed along the longitudinal axis x and blocked along the transverse axis y. The notched zones 312a, 312b and the first notched zones 322a of the intermediate parts 322 include parallel slots oriented perpendicular to the longitudinal axis x. In gripped contact, the slots of the notched zones 312a, 312b can then be interleaved with those of the first notched zone 322a of the intermediate parts 322 and block their mobility. A maintaining lip 328 can secondarily be arranged on the intermediate part 322 so as to abut with the edge of the platen 312 and thus limit any exaggerated translation of the intermediate part 322 in the direction going from one end of the platen 312 toward its central part.

The intermediate parts 322 each include a second notched zone 322b on their visible face, delimited by two flat surfaces 326, and oriented perpendicular relative to the first notched zone 322a. The second notched zone 322b cooperates with a notched zone 327 arranged on the support frame 2. The two flat surfaces 326 are arranged so as to frame the notched zone 327 of the support frame 2. The assembly of the platen 312 and intermediate parts 322 can then remain movable relative to the support frame 2 along the transverse axis y while remaining blocked along the longitudinal axis x relative to the support frame 2 by the effect of the flat surfaces 326. During tighter contact, the intermediate parts 322 become immobilized on the frame of the support 2 owing to the cooperation of their second notched zone 322b with the corresponding notched zone 327 of the support frame 2.

Owing to the intermediate parts 322, the platen 312 is movable relative to the support frame 2 along the two longitudinal x and transverse y axes. This makes it possible to adjust the position of the chassis 10c of the framework structure 10 relative to the axis 1a of the support 1 before locking the adjustable fastening system. The support frame 2 according to this arrangement is provided with flexible crosspieces 43 each able to be superimposed on an intermediate part 322. The support frame 2 is also provided with a guideway system 44 making it possible to insert the locking device 4b. The locking device 4b can be provided with two bosses 45. When the locking device 4b is inserted in the system of guideways 44 up to its locking position, each of the bosses 45 bears on the corresponding flexible crosspiece 43 so as to grip the contact of the notched zones 312a, 312b of the platen 312 with the first notched zone 322a of the intermediate parts 322 and that of the second intermediate zone 322b with the notched zone 327 of the support frame 2.

Preferably, the notched zone 327 is arranged directly on the flexible crosspiece 43 and the flat surface 326 of the intermediate parts 322 bordering the crosspieces 43. Alternatively, the notched zone 327 is arranged on a connecting part, in turn fastened on the flexible crosspiece 43.

Optionally, the adjustable fastening system S of the present invention contains an additional safety, making it possible to keep the locking device 4 in place.

This additional safety takes the form of a clipping element 46 making it possible to keep the locking device 4b in place. The clipping element 46 in particular cooperates with a clipping tongue 47 secured to the support frame 2. The clipping tongue 47 is flexible, so as to retract upon passage of the locking device 4b, and to return to its position once the locking device 4b is in place. The free end of the clipping tongue 47 can advantageously have a beveled shape. The clipping tongue 47 comprises a shape complementary to the clipping element 46 and thus makes it possible to keep the locking device 4b in position.

Optionally, the locking device 4b is provided with a window 48, allowing the accessibility to the axis of the support 1a and to the clipping part 313. The window 48 of the locking device 4b makes it possible to disconnect the chassis 10c from the framework structure 10 of the supports 1 without modifying the adjustment of the adjustable fasteners 6. The chassis 10c of the framework structure 10 can easily be disconnected from the support 1, by causing the clipping element 313 to move against the force of the springs 314, so as to align the holes of the platen 312 and the clipping element 313. It then suffices to pull on the chassis 10c of the framework structure 10 to separate it from the support 1.

FIGS. 4a, 4b, 4c illustrate a detail of a third embodiment of an adjustable fastening system. The support 1 is made up of a support axis 1a oriented perpendicular to the wall P, along the direction z. The support axis 1a is a shaft comprising a thread 401 making it possible to cooperate with the attaching device 31 of the adjustable fastener 6. The attaching device 31 is in particular an attaching device 31c, comprising an attaching part 410 which supports a notched lever 416. The notched lever 416 is rotatable around the axis X416 relative to the attaching part 410. The attaching part 410 comprises a first receiving zone 411 of the support axis 1a and the first tab 417 of the lever and a second receiving zone 412 of the second tab 419 of the lever.

The attaching part 410 can be mounted in a support frame 2, the attaching part 410 being mounted movably relative to the chassis 10c of the framework structure along two orthogonal directions (for example mounted loose in a housing formed between the support frame and the chassis) or to replace the clipping part 313 and springs 314 of the preceding embodiment.

During the installation of the framework structure 10 to the wall P, the attaching part 410 is inserted around the support 1 and the lever is tilted by action on the second tab 419. Once the chassis 10c of the framework structure is positioned in the direction of the axis of the support 1a, the lever is tilted again in the opposite direction, such that the notchings 418 of the first tab of the lever 416 cooperate with the thread 401 of the support 1. The action on the second tab of the lever and its return into position could alternatively be done under the resilient action of a spring (not shown), the notchings 419 then being oriented so as to force the tilting of the lever 416 when the chassis 10c of the framework structure 10 is moved toward the wall P.

The cooperation of the notchings of the first tab of the lever 416 and the thread 401 of the support 1 makes it possible to keep the chassis 10c of the framework structure suspended from the support 1. The adjustment of the position of the chassis 10c of the framework structure can then be done either by sliding of the support frame 2 and the chassis 10c of the framework structure, or by using the adjusting device described in reference to the third embodiment.

The locking device 4 then consists of a simple nut 422, which grips the set of moving parts against the chassis 10c of the framework structure 10 or against the wall P. Alternatively, a rotation, for example a half-revolution of screwing of the attaching part 410, makes it possible to grip the set of moving parts relative to one another, by rotational cooperation of the notchings 419 with the thread 401 of the support axis 1a. A disassembly and readjustment will be possible by performing a half-revolution of unscrewing of the attaching part 410 relative to the support axis 1a and by tilting the lever to release the notchings 419 of the thread 401 of the support axis 1a.

Figure 5B:
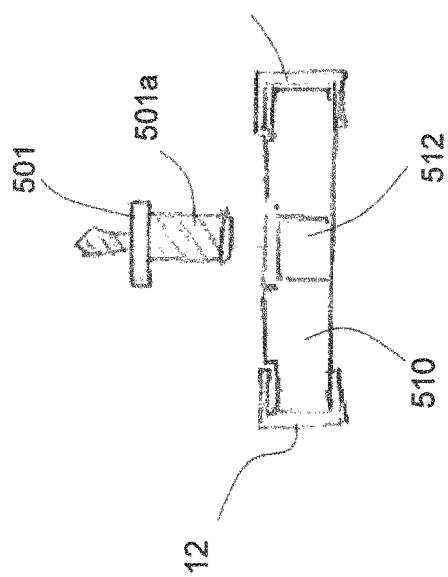
FIGS. 5a, 5b: example of adjustable fastener according to a fourth embodiment, where
Figure 5A:
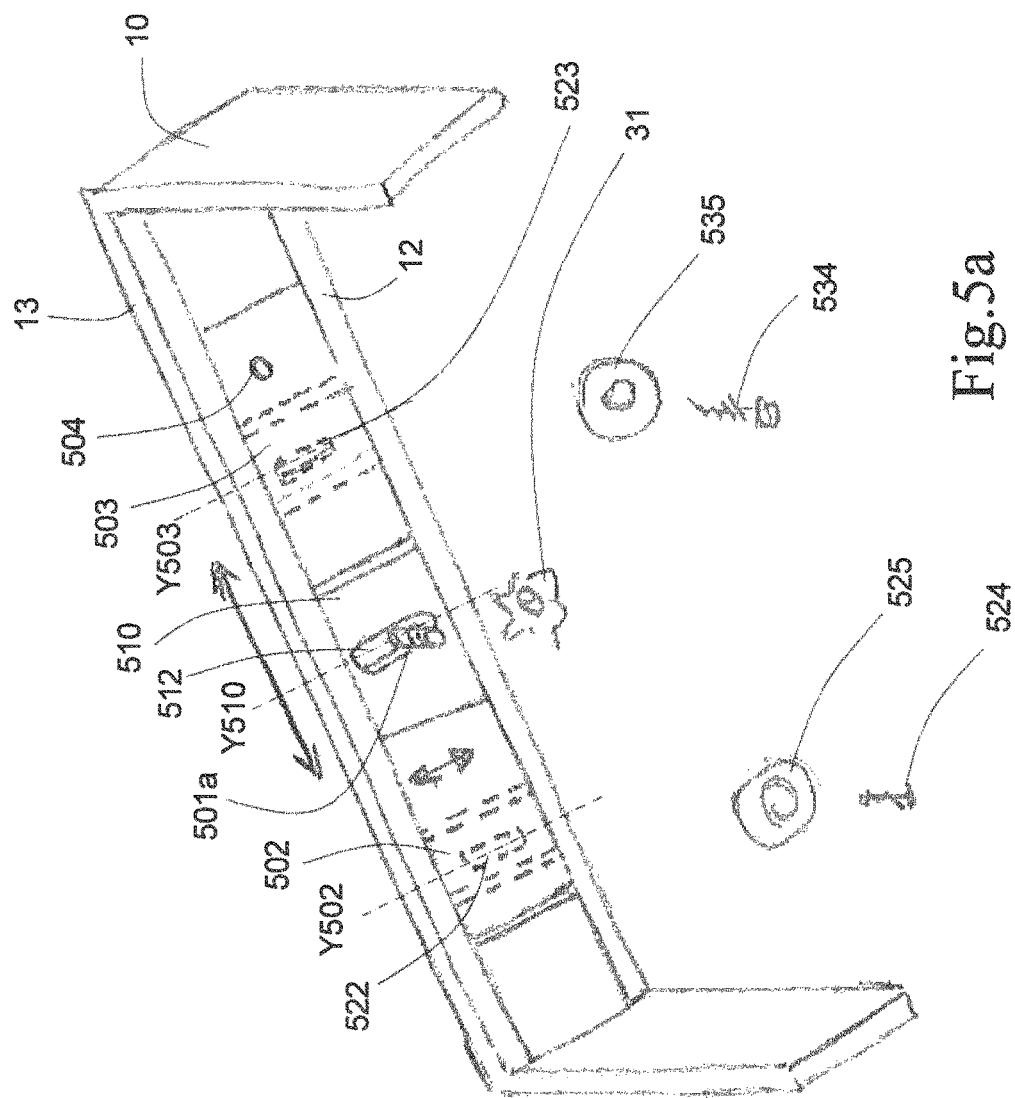

FIGS. 5a, 5b illustrate a fourth embodiment of an adjustable fastening system.

The chassis 10c of the framework structure 10 is made from two angle bars 12, 13 each having a C-shaped section, the openings of the two C-shaped angle bars facing one another. The chassis 10c of the framework structure 10 thus forms a rail in which support frames 2 can slide and be guided, along the longitudinal main axis x of the framework structure 10. A first support frame 510 comprises an oblong opening 512, the direction Y510 of which is perpendicular to the longitudinal main axis x of the framework structure 10. The first support frame 510 is mounted with the oblong opening 512 around the support axis 1a. A first central support 501 is fastened in the wall P and has a threaded support axis 501a. The thread of the support axis 501 constitutes the holding device (M) of the support 1. The first support frame 510 is fastened by an attaching means 531 to the support axis 501*a*. The attaching means 531 takes the form of a nut or any other equivalent element, which can be screwed on the threaded support axis 501*a*. Advantageously, the attaching means 531 is mounted on the support axis 501*a* while leaving play between the attaching means 531, the first support frame 510, the chassis 10*c* of the framework structure 10 and the wall P. Thus, the first support frame 510 being blocked in translation along the support axis 510*a* on the one hand by the attaching means 531 and by the angle bars 12, 13 of the chassis 10*c* of the framework structure 10, the chassis 10*c* in turn is held on the central support 501 and supported by the attaching means 531. Due to the play left on the attaching means 531, the first support frame 510, the chassis 10*c* and the wall P, the installer next has the possibility of adjusting the position of the chassis 10*c* relative to the opening, along two orthogonal directions. The sliding of the first support frame 510 relative to the chassis 10*c* along the longitudinal main axis x makes it possible to move the chassis 10*c* relative to the first central support 501 along the longitudinal main axis x. The presence of the oblong opening 512 also makes it possible to move the first support frame 510 and the chassis 10*c* along the direction Y510. This first adjustment allows an approximate definition of the position of fastening holes 504 for the locking device 4.

The framework structure comprises a second support 502 and a third support 503, these being mounted sliding in the rail formed by the angle bars 12, 13 of the chassis 10*c*, similarly to the first central support 501, preferably on either side of the first support 501.

The second 502 and third 503 supports each comprise an oblong opening 522, 532 along an axis Y522, Y532 parallel to the axis Y510, and through which a fastening screw 524, 534 can pass.

The adjustable fasteners 6 in particular comprise the second support 502 and the third support 503. Fastening holes 504 can be pierced approximately in the wall P, in which the fastening screws 524, 534 have just been screwed. The adjustable fasteners 6 being translatable along the chassis 10*c* and the chassis 10*c* being translatable along the axes Y502 and Y503 relative to the fastening screws, the framework structure can be centered relative to the opening, along two orthogonal directions.

The locking device 4 comprises the fastening screws 524, 534 and optionally washers 525, 535. When the fastening screws 524, 534 are screwed tightened against the wall P, the position of the support frames 502, 503 and the chassis 10*c* is blocked by tightening against the wall. Thus, in the same way as in the previous embodiments, the mounting is made easier, the chassis 10*c* of the framework structure 10 is provisionally held at the wall before being positioned along two orthogonal directions and locked in the chosen position.

FIGS. 6*a*, 6*b* illustrate a fifth embodiment of an adjustable fastening system.

The chassis 10*c* is made from two brackets 602 (only one of which is shown), forming end parts of the chassis 10*c*. The bracket 602 has a first face 602*a*, on which a hook 7 is arranged making it possible to fasten a blind to the framework structure, and a second face 602*b* perpendicular to the first face 602*a*. The second face 602*b* forms a rail 603, open toward the other bracket 602. The chassis 10*c* also comprises a central rail 606, which is held on the brackets and at a distance therefrom by side beams 604, 605. The support frame 612 is housed partially in the rail formed by the second face of the bracket and partially in the central rail.

The support frame 2 can thus slide and be guided in translation along the longitudinal main axis x of the framework structure 10 as well as along the transverse axis y perpendicular to the longitudinal axis x.

A first support 601 is fastened in the wall P, for example by a screw (not shown) passing through the support and screwed in the wall P. It has a support axis 601*a* that is at least partially threaded. The support axis 601*a* thus comprises a first part 601-1 that may or may not be threaded, having a first diameter d601-1 and a second threaded part 601-2 having a second diameter d601-2, greater than the first diameter d601-1. The thread of the second part 601-1 corresponds to a holding device M of the support 601 and forms an overthickness relative to the diameter d601-1 of the first part 601-1. The adjustable fasteners 6 are described hereinafter. They each comprise a support frame 612 situated at a first end 10*a* of the framework structure 10. An equivalent support frame (not shown) is situated at a second end 10*b* of the framework structure 10. The support frame 612 comprises an opening 614 extending from one edge 616 of the support frame.

The opening 614 comprises an inlet zone 618 and a bottom zone 620. Walls 618*a* and 618*b* of the inlet zone 618 guide the movement of the first support 601 toward the bottom zone 620. Walls 620*a* and 620*b* delimit the opening 614 in the bottom zone 620. The minimum distance d618 between the walls 618*a* and 618*b* is slightly greater than the diameter d601-1 of the first part 601-1 of the support axis 601*a* but less than the second diameter 601-2 of the second part 601-2 of the support axis 601*a*. Likewise, the distance d620 between the walls 620*a* and 620*b* of the bottom zone 620 is slightly greater than the diameter d601-1 of the first part 601-1 of the support axis 601*a* but less than the second diameter 601-2 of the second part 601-2 of the support axis 601*a*. The bottom zone 620 also comprises a substantially circular hollow 622, in the thickness of the first support frame 612, emerging on the face of the frame opposite the support. The diameter d622 of this recess 622 is slightly greater than the second diameter 601-2 of the second part 601-2 of the support axis 601*a*. The recess 622 corresponds to an attaching device 31 of the adjustable fastener 6. Indeed, during the insertion of the support axis 601*a* into the opening 614, the second threaded part 601-2 becomes housed in the recess 622 of the support frame 601. Due to the weight of the chassis 10*c*, the support axis 601*a* is blocked in the support frame 601, which holds the framework structure 10 to the wall without needing another element. In the case where two supports 601 are mounted on a horizontal wall, such as a ceiling, the chassis 10*c* is then suspended from the supports 601, via two adjustable fasteners 6 cooperating with the two supports 601, the second part 601-2 of the support axis 601 having a diameter greater than the distance between the walls 620*a* and 620*b* of the bottom zone 620 of the opening 614. In the case where two supports 601 are mounted on a vertical wall, such as a partition, the adjustable fasteners 6 of the framework structure 10 rest on the second threaded part inserted into the recess 622, thus holding the framework structure without needing another element.

Adjustable fasteners, in particular the support frame 601, are translatable along the orthogonal axes x and y relative to the framework structure, due to the existence of play in these two directions, between the adjustable fasteners 6 and the chassis 10*c*.

Once the chassis 10*c* of the framework structure 10 is held by cooperation of the holding device M and the attaching device 31, the chassis 10*c* preserves a freedom of movement relative to the supports 601 along at least two orthogonal axes, in particular by offsetting adjustable fasteners 6 relative to the rails 613, 606. Once the chassis 10c is in the chosen position, it can be locked in position by tightening. The locking device 4 to that end comprises a nut 624, which becomes screwed on the threaded second part 601-2 of the support axis 601a. The screwing of the nut 624 on the threaded second part 601-2 of the support axis 601a presses the support frame 612 of the adjustable fastener 6 against the chassis 10c of the framework structure 10, as well as the chassis 10c against the wall P. The adjustable fasteners 6 and the chassis 10c are thus locked in position by tightening. Thus, in the same way as in the previous embodiments, the mounting is made easier, the chassis 10c of the framework structure 10 is provisionally held to the wall before being positioned along two orthogonal directions and locked in the chosen position.

FIGS. 7a, 7b illustrate a sixth embodiment of an adjustable fastening system.

The chassis 10c is made from two brackets 702, 703, forming end parts of the chassis 10c. The bracket 702 has a first face 702a, on which a hook 7 is arranged making it possible to fasten a blind to the framework structure, and a second face 702b perpendicular to the first face 602a. Two L-shaped angle bars 12, 13 are fastened on the second face 702b, thus holding the brackets at a chosen distance relative to one another. On the chassis 10c, primarily made from aluminum parts or the like, the properties of the aluminum being strength and lightness, attached, on either side of the chassis 10c, is an attaching means 31 in the form of a ferrous metallic plate. The attaching means is attached on at least part of the second face 702b of the bracket 702 oriented toward the wall P and extends at least partially on the angle bars 12, 13.

The attaching means 31 also comprises an aperture 710 in the form of a quadrilateral, for example square.

A first support 701 is fastened to the wall P, for example by gluing. A second support of the same type is also attached and fastened on the wall P. These supports are positioned approximately on either side of the zone where the chassis 10c of the framework structure 10 must be installed. The first and the second support comprises a sticky face making it possible to secure it to the wall P and a face including a holding device M. The latter assumes the form of a magnetic plate. During the installation of the chassis of the framework structure at the wall, the cooperation of the attaching device 31 and the holding device 31 of a support 701 makes it possible to hold the chassis 10c of the framework structure 10 provisionally at the wall P.

The framework structure 10 comprises an adjusting device 32 for adjusting the position of the chassis 10c relative to the support 1. Indeed, the surface of the attaching device 31 is much larger than the surface of the holding device M. The chassis 10c can therefore be provisionally held in several positions relative to the supports 1, while preserving a freedom of movement relative to the supports 701 along at least two orthogonal axes. It can thus be adjusted along at least orthogonal directions relative to each support 701.

Once the chassis 10c is in the chosen position, it can be locked in position by tightening.

Indeed, the aperture 710 makes it possible to pierce the wall P in an approximate position, to screw and hold, by tightening, the chassis 10c of the framework structure against the wall P. The aperture 711 is arranged so as to be opposite the aperture 710. To that end, the locking device 4 comprises at least one screw 712 and a washer 714, the surface of which is larger than the surface of the aperture 710. The adjustable fasteners 6 and the chassis 10c are thus locked in position by tightening, the washer 714 bearing against the attaching device and/or the angle bars 12, 13 of the chassis 10c. Thus, in the same manner as in the previous embodiments, the mounting is made easier, the chassis 10c of the framework structure 10 is provisionally held to the wall before being positioned along two orthogonal directions and locked in the chosen position.

The present invention also relates to a method for installing a framework structure 10 of a piece of home automation equipment, provided with an adjustable fastening system as described above. In particular, the installation method includes a first step for fastening supports 1 on the wall P. At least two supports 1 are necessary to hold and adjust the framework structure 10 on the wall P, but three or four supports 1 may be necessary for long-range equipment, or more. The supports 1 are arranged in a straight line, with a predetermined interval. A template may optionally be used to drill the holes in the wall P, for better precision. Alternatively, center distance measurements can be made on the wall P before drilling. The supports 1 are arranged so as to present their support axis 1a perpendicular to the wall P. The installation method includes a second step for mechanical connection of the chassis 10c of the framework structure 10 to the supports 1. To do this, the installer brings the chassis 10c of the framework structure 10 to be installed close to the wall P so as to place the adjustable fasteners in contact with the end of the corresponding supports 1. The installer then exerts sufficient pressure to allow the mechanical connection between the adjustable fasteners and the supports 1. Owing to the beveled end of the support axes 1a and the free movement of the adjustment means 32 of the adjustable fasteners 6, the mechanical connection is automatically established and allows the suspension of the chassis 10c of the framework structure 10 from the wall P.

The installation method includes a third step for adjusting the position of the chassis 10c of the framework structure 10 relative to the supports 1. This step makes it possible to best align the piece of home automation equipment 10 relative to the supports 1. This step makes it possible to best align the piece of home automation equipment with the guide systems or the other elements of the home automation assembly. In particular, the installer can adjust the position of the chassis 10c of the framework structure 10 along two movement axes x, y, both parallel to the wall P and perpendicular to one another, by exerting the necessary pressure on the chassis 10c of the framework structure 10 along one or the other of the movement axes. The adjustment of the position of the chassis 10c of the framework structure 10 is done owing to the free movements of the adjustment means 32 of the adjustable fasteners 6. The adjustment step can additionally include the adjustment of the position of the support frame 2 relative to the chassis 10c of the framework structure 10. The adjustment can in particular be done owing to the presence of oblong holes.

The installation method comprises a fourth step for locking the position of the chassis 10c of the framework structure 10 once adjusted. The locking operation is done by locking the adjustable fasteners 6 owing to their locking device 4. It is sometimes possible for the movement of the adjusting means 32 to be too free, and it then does not make it possible to keep the chassis 10c of the framework structure 10 in place before locking. It is then possible to consider using the locking device 4 to temporarily increase the friction forces between the adjusting means 32 and thus to facilitate the adjustment of the positioning of the chassis 10c of the framework structure 10. If the locking is done by tightening, then a pre-tightening can be considered, for example by lightly screwing the locking device 4. The locking makes it possible, if needed, to lock the position of the support frame relative to the chassis 10c of the framework structure.

Figure 3C:
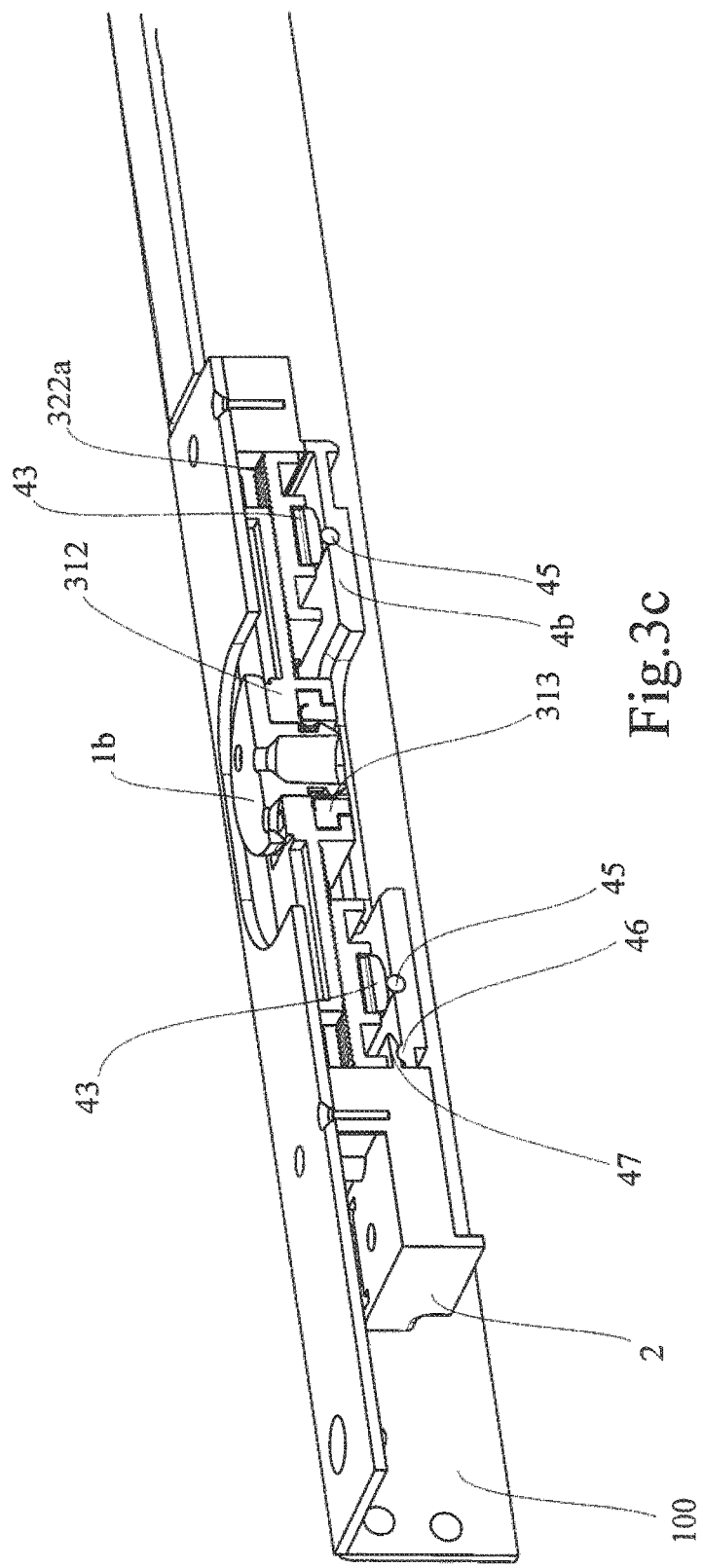

An additional step for securing the locking device 4 can optionally be carried out. If the locking device is a sliding system 4b as described in FIGS. 3a to 3c, a clipping element 46, cooperating with a clipping tongue 47, can be provided to keep it in place, once in position.

The present invention also relates to a framework structure 10 for a piece of home automation equipment equipped with at least two adjustable fasteners 6 as described above.

Other fasteners can be necessary to fasten a chassis 10c for a very wide piece of home automation equipment, in particular greater than 1 m. A so-called idle fastener can be provided to that end. In this case, the fastener can be clipped on a support 1, similarly to what has been described above. The idle fastener in particular comprises a platen 312 or a support frame 2 movable along the longitudinal x and transverse y axes, without requiring an adjusting device 32 or locking devices 4 as described for the adjustable fasteners 6. Preferably, an idle fastener will be used in the central position of the framework structure 10, while the adjustable fasteners 6 will be used at the end 10a, 10b of the framework structure 10.

According to one embodiment variant, an adjustable fastener 6 can have features shared by the different embodiments. In particular, the adjustable fastener 6 can comprise a support frame 2 translatable along the longitudinal axis to the framework structure 10. The fact that the support frame 2 is movable makes it possible to position it at supports 1 fastened on the wall and to slide the chassis 10c of the framework structure along support frames 2 in order to center the latter relative to the opening. The support frame in turn comprises a part provided with an oblong hole, extending along the transverse axis y. Advantageously, the attaching device 31 comprises a clipping part whose operation is similar to the clipping parts 313 of the second embodiment and translatable along the longitudinal axis relative to a platen 312 of the support frame 2, makes it possible to secure the support frame 2 easily in the slot of the support 1. The resilient force on the clipping part does not prevent an adjustment of the support frame 2 along the transverse axis y allowed by the oblong hole.

A locking device, similar to that of the first embodiments, comprising a threaded element, cooperating with the end of the axis of the support 1a, allows the pinching of the clipping part and/or of the support frame on the support 1, this pinching having the additional effect of preventing the movement of the support frame 2 relative to the chassis 10c of the framework structure 10 and relative to the support 1. The movement of the chassis 10c of the framework structure 10, adjustable along the longitudinal and transverse axes before the locking, can thus be blocked along one or both axes after locking.

The longitudinal x and transverse y axes are provided for information, the degree of freedom axes of the attaching, holding or adjusting devices, or the directions of the notched zones described above can naturally be reversed without changing the operation of the adjustable fastening system.

The invention claimed is:

1. A framework structure of a piece of home automation equipment on a wall, comprising at least one support comprising a support axis and a holding device, the support being able to be secured to the wall, wherein the holding device comprises a chassis and at least two adjustable fasteners, wherein the adjustable fasteners each comprise an adjusting means, a locking means, and a holding means, wherein the holding means holds the framework structure on the wall, wherein the adjusting means allows an adjustment of the chassis of the framework structure along at least two directions orthogonal to one another and that are each orthogonal relative to the support axis while the framework structure is supported, and wherein the locking means comprise a locking position that prevents adjustment of the adjusting means so that the framework structure is fixed relative to the wall along the two directions when the locking means is in the locking position.

2. The framework structure according to claim 1, comprising:
at least two supports each including a support axis and a holding device, the at least two supports adapted to be secured to the wall, and at least two holding devices corresponding to respective ones of the supports.

3. The framework structure according to claim 1, wherein the adjusting means comprises a support frame translatable relative to the chassis and wherein the locking means in the locking position blocks the movement of the support frame relative to the chassis of the framework structure.

4. The framework structure according to claim 1, wherein the support comprises an at least partially threaded element fastened to the wall.

5. The framework structure according to claim 4, characterized in that the locking means comprises a tapped element engaged with the support along the support axis.

6. The framework structure according to claim 5, characterized in that the at least partially threaded element comprises a nut threaded on a screw thread of the support along the direction of the support axis so as to grip the holding means in the direction of the support axis.

7. The framework structure according to claim 1, wherein the chassis comprises at least two notched regions facing one another and at a distance from one another, wherein the adjusting means comprises the at least two notched regions slideably engaged with at least two respective rails along two orthogonal directions.

8. The framework structure according to claim 1, further comprising an opening adjacent the holding means, wherein the holding means is accessed through the opening.

9. The framework structure according to claim 8, wherein the support comprises a recess in the thickness of the first support frame and wherein the holding means comprise a clipping part, wherein the clipping part engages the recess to hold the framework structure on the wall.

10. An installation method on a wall of the framework structure of a piece of home automation equipment according to claim 1, the method comprising the following successive steps:
fastening at least one support to the wall,
connecting the framework structure on the holding means, the chassis of the framework structure thus being self-supported by the support,
adjusting a position of the adjusting means along at least one of the two orthogonally independent directions, and
locking the position of the adjusting means relative to the chassis of the framework structure by moving the locking means into the locking position.

11. The installation method according to claim 10, characterized in that it comprises the following steps:
adjusting the position of the adjusting means along the two orthogonally independent directions, and locking the position of the adjusting means relative to the chassis of the framework structure by moving the locking means into the locking position.

12. The installation method according to claim 10, wherein the locking means comprises a tapped element engaged with the support along the support axis, the method further comprising gripping the adjusting means against the chassis of the framework structure and the chassis of the framework structure against the wall.

13. A framework structure for a piece of home automation equipment comprising:
- a support adapted to be fixed to a wall;
- a platen fixed with the support, the platen comprising one or more platen notched zones arranged along a first axis of the platen;
- one or more intermediate parts, wherein the one or more intermediate parts each include a first notch on a first side of the intermediate part arranged along the first axis and fitted over a respective one of the notch zones and a second notch along a second axis on a second side of the intermediate part opposite the first side;
- a support frame connected with a chassis of the home automation equipment, wherein the support frame comprises one or more flexible cross pieces arranged along the second axis and wherein the second notch of the one or more intermediate parts is fitted over ones of the flexible cross pieces; and
- a locking device, wherein the locking device includes one or more bosses positioned to deform respective ones of the flexible cross pieces toward the platen when the locking device is in a locking position,
- wherein, when the locking device is in a support configuration, the first notch of the intermediate part is movable along the first notch zone of the platen along the first axis and the second notch of the intermediate part is moveable along the flexible cross piece along the second axis to adjust a position of the chassis along the first and second axes, and
- wherein, when the locking device is in the locking position, the flexible cross pieces are pressed against the second notch of respective ones of the intermediate parts, wherein the first notch is pressed against the respective ones of the notch zones of the platen to prevent motion of the intermediate parts relative to the support frame and platen, and wherein the chassis is fixed along the first and second axes.

14. The support of claim 13, wherein the support comprises a support axis and a groove disposed around the support axis, wherein the platen further comprises:
- an opening sized to accept insertion of the support; and
- a clipping element slidably engaged on the platen, wherein the clipping element has a first position aligned with the opening to allow passage of the support through the opening and a second position where the clipping element engages with the groove to removably fix the platen with the support by engagement of the clipping element and the groove.

* * * * *